No. 746,383. PATENTED DEC. 8, 1903.
J. S. ROWELL.
DISK DRILL SEEDING MACHINE.
APPLICATION FILED AUG. 27, 1903.
NO MODEL. 2 SHEETS—SHEET 1.
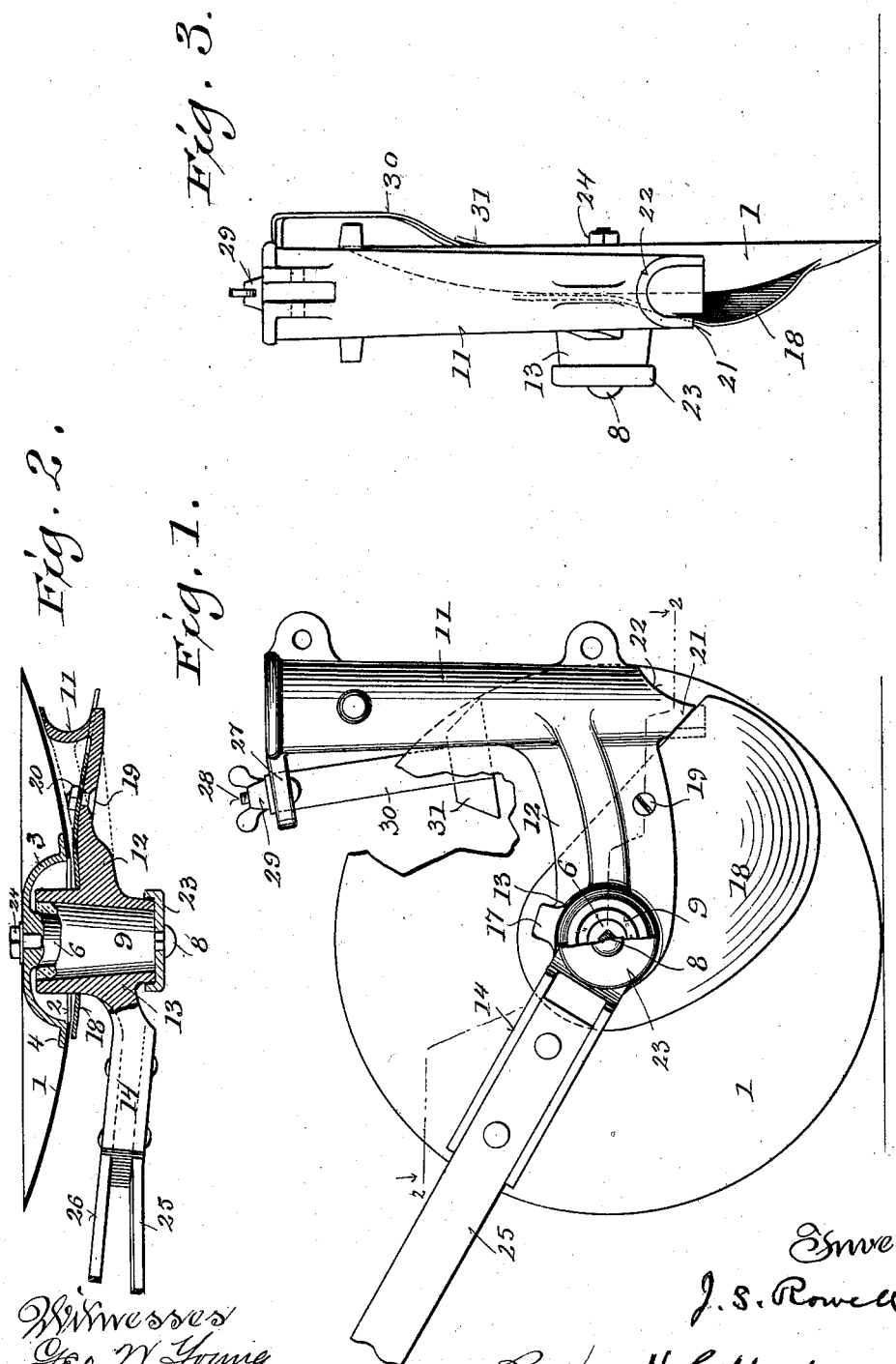

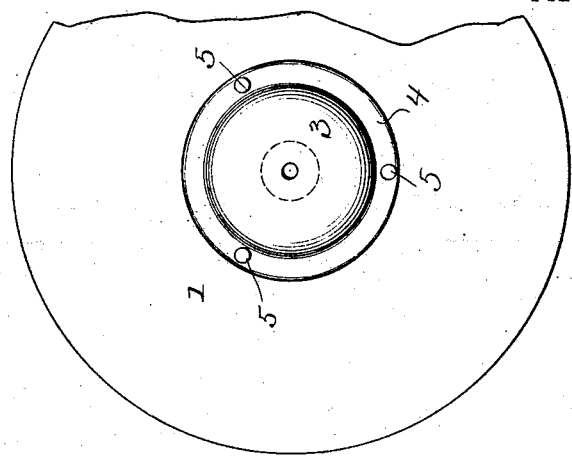
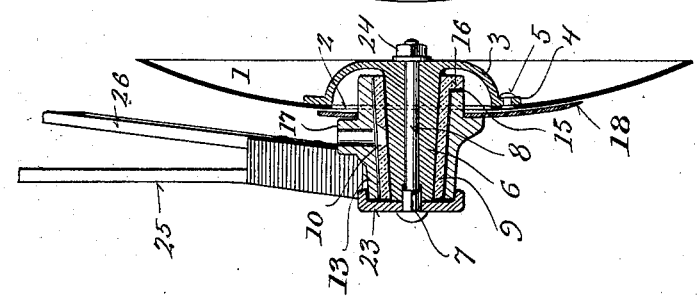
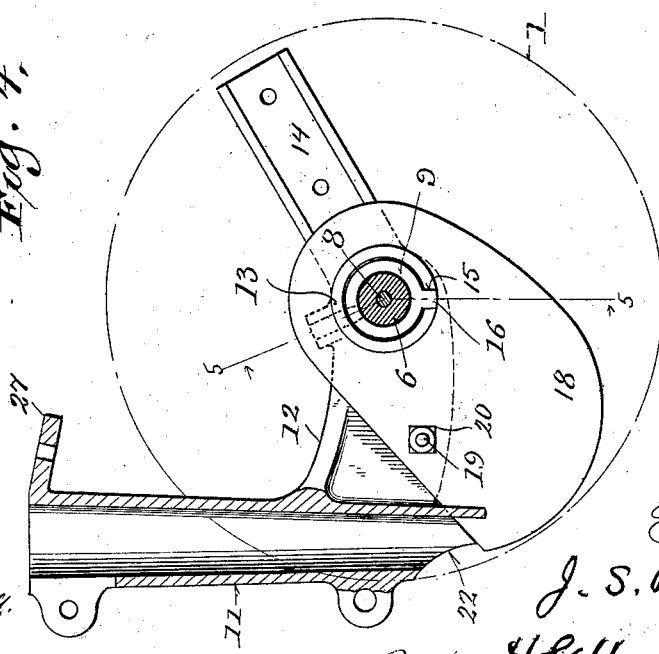

No. 746,383. Patented December 8, 1903.

UNITED STATES PATENT OFFICE.

JOHN S. ROWELL, OF BEAVERDAM, WISCONSIN.

DISK-DRILL SEEDING-MACHINE.

SPECIFICATION forming part of Letters Patent No. 746,383, dated December 8, 1903.

Application filed August 27, 1903. Serial No. 170,912. (No model.)

*To all whom it may concern:*

Be it known that I, JOHN S. ROWELL, a citizen of the United States, and a resident of Beaverdam, in the county of Dodge and State of Wisconsin, have invented certain new and useful Improvements in Disk-Drill Seeding-Machines; and I do hereby declare that the following is a full, clear, and exact description thereof.

My invention has especial reference to that class of seeding-machines known as "disk drills;" and it consists in certain peculiarities of construction and combination of parts, as will be fully set forth hereinafter in connection with the accompanying drawings and subsequently claimed.

Figure 1 of said drawings is a view in side elevation of the convex side of one of my improved disks and adjacent parts, partly broken away to better represent certain details of construction. Fig. 2 is a sectional view thereof, taken on the line 2 2 of Fig. 1. Fig. 3 is a view in rear elevation of said parts. Fig. 4 is a partly-sectional view in elevation of certain of the parts shown in Fig. 1 viewed from the opposite side. Fig. 5 is a detail sectional view taken on the line 5 5 of Fig. 4, and Fig. 6 is a broken view of the disk detached and showing the concave outer side thereof.

Referring by numerals to the drawings, 1 represents one of the disks of a seeder of the type referred to, said disks, with their attached parts, as shown, extending transversely from side to side of the machine, one half of the disks presenting their concave outer surfaces toward the left-hand wheel of the seeder and the other half of the disks being of reversed construction, with their concave outer surfaces toward the right-hand wheel, but otherwise all of the said disks being identical in construction. Each disk is centrally formed with a round hole 2 therethrough, which is covered on the concave outer side by the convex plate 3, having an annular flange 4 secured to the disk 1 by bolts 5 passing through registering holes in said disk and plate-flange and suitable nuts. This plate 3 has cast integrally therewith a conical longitudinally-bored hub 6, projecting through the central hole 2 in the disk 1, the bore at the inner end of said hub having squared walls to take the corresponding squared end 7 of the bolt 8, which passes through said hub, while surrounding said hub is a conical sleeve 9, formed with an oil-inlet 10 therethrough.

The concave disk is made of thin sheet-steel and the seed-tube 11 of cast or malleable iron, and the latter is formed with an inwardly-projecting foot 12, terminating in an upwardly-projecting offset portion 14 and having an intermediate transverse tubular portion 13, whose bore is tapered or conical and which fits over the described conical sleeve 9, the said tubular portion projecting on both sides of the foot 12, beyond the planes thereof, and the end of said portion 13 within the convex plate 3 and which is its greatest diameter having a slot 15 for the reception of a lug 16, projecting from the corresponding end of the sleeve 9, and said portion 13 is further provided with a boss 17, having a bore therethrough, which latter is kept in line with the oil-inlet 10 of the sleeve 9 by the described slot-and-lug connection of said parts, whereby the hub 6 may be kept lubricated.

18 represents a scraper of thin sheet-steel whose inner end is formed with a round hole therethrough to enable it to fit over the described tubular portion 13 and whose inner lower edge is curved, so as to lie closely adjacent to the convex surface of the disk 1, and which is clamped between said disk and the foot 12 and held to the latter by a single screw-bolt 19 and nut 20, back of which the upper rear edge of said scraper bears against the lower cut-away end of the seed-tube 11, which forms a heel with an inclined edge 21 for this purpose. The said seed-tube 11 is also cut out at the rear, as shown at 22, so that the seed may escape downward and rearward, being further guided in its descent by falling between and against the convex surface of the disk 1 and the rear concaved end of the said scraper 18. The upper or inner end of the said scraper 18 is made of sufficient width to wholly cover and protect the hole 2 of the disk 1, and thereby to keep all dirt and foreign substances away therefrom, which would otherwise clog the same and interfere with the rotation of the said disk. When the parts named have been put together, as described, a centrally-perforated flanged cap 23 is fitted over the exposed ends of the hub 6, sleeve 9, and portion 13 of the foot 12, and the described bolt 8 fitted to place and secured by nut 24, as best shown in Fig. 5. The offset end portion of the foot 12 is preferably grooved on each side and perforated for the reception of the straps 25 26, forming the inner ends of a drag-bar, both of said straps being on the convex side of the disk 1. The upper end of the seed-tube 11 is provided with a projecting perforated lug 27, (above and extending in line with the travel of the disk,) to which lug is secured by screw-bolt 28 and thumb-nut 29 a bent spring-arm 30, carrying at its lower end a scraper 31 for the concave side of the disk 1. The seed-tube 11 is further provided with ears and trunnions for attachment to a press-wheel or covering-chain, as desired; but I have not deemed it necessary to show such, as they are of well-known construction and form no part of my present invention.

Having thus described my invention, what I claim as new, and desire to secure by Letters Patent, is—

1. The combination with a concave disk of thin sheet-steel having a central hole therethrough, of a convex plate secured to the concave side of said disk, and having a hub extending through said hole; a seed-tube having an inwardly-extending foot, terminating in an offset end for attachment to a drag-bar, and having an intermediate transverse tubular portion for the reception of said hub; and an independent scraper, of thin sheet-steel, surrounding said tubular portion, and curved on its inner and under edges to engage with and clean the convex surface of said disk, and with said inner end of the scraper closely covering the central hole thereof, said scraper being held between said foot and the convex side of said disk.

2. The combination with a concave disk of thin sheet-steel, having a central hole therethrough, of a convex plate secured to the concave side of said disk, and having a longitudinally-bored conical hub extending through said hole; a conical sleeve surrounding said hub, and formed with an outwardly-projecting lug at its larger end; a seed-tube, having an inwardly-extending foot, terminating in an offset end for attachment to a drag-bar, and having an intermediate transverse conical tubular portion projecting on each side of the said foot, and surrounding said sleeve, the larger end of said tubular portion having a slot for engagement with the sleeve-lug; an independent scraper of thin sheet-steel, surrounding said tubular portion, and curved on its inner and under edges, to engage with and clean the convex surface of said disk, said scraper being held in removable engagement with the lower end of said seed-tube, between the foot thereof and the convex side of said disk; a centrally-perforated flanged cap covering the exposed ends of the said hub, sleeve, tubular portion; and a bolt extending through the said cap and the bore of said hub, and provided with a nut on its opposite end.

In testimony that I claim the foregoing I have hereunto set my hand, at Beaverdam, in the county of Dodge and State of Wisconsin, in the presence of two witnesses.

JOHN S. ROWELL.

Witnesses:
 W. H. STACY,
 B. F. BARBER.